US 10,558,840 B2

(12) United States Patent
Dai et al.

(10) Patent No.: US 10,558,840 B2
(45) Date of Patent: Feb. 11, 2020

(54) FINGERPRINT RECOGNITION METHOD AND ELECTRONIC DEVICE

(71) Applicant: Huawei Technologies Co., Ltd., Shenzhen (CN)

(72) Inventors: Jinhong Dai, Xi'an (CN); Yingjun Xi, Xi'an (CN); Yufeng Che, Xi'an (CN); Xiaolong Wang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 15/773,455

(22) PCT Filed: Jan. 6, 2016

(86) PCT No.: PCT/CN2016/070324
§ 371 (c)(1),
(2) Date: May 3, 2018

(87) PCT Pub. No.: WO2017/117762
PCT Pub. Date: Jul. 13, 2017

(65) Prior Publication Data
US 2018/0330145 A1 Nov. 15, 2018

(51) Int. Cl.
G06K 9/00 (2006.01)
G06F 21/32 (2013.01)

(52) U.S. Cl.
CPC ......... G06K 9/00087 (2013.01); G06F 21/32 (2013.01); G06K 9/0002 (2013.01)

(58) Field of Classification Search
CPC .. G06F 21/32; G06K 9/00013; G06K 9/0002; G06K 9/00087; G06K 9/036
(Continued)

(56) References Cited

U.S. PATENT DOCUMENTS 8,391,568 B2 * 3/2013 Satyan ............... G06K 9/00026
382/124
2009/0008160 A1 1/2009 Aroyan et al.
(Continued)

FOREIGN PATENT DOCUMENTS

CN 1696960 A 11/2005
CN 1753524 A 3/2006
(Continued)

OTHER PUBLICATIONS

Machine Translation and Abstract of Chinese Publication No. CN104142742, Nov. 12, 2014, 11 pages.
(Continued)

Primary Examiner — Charlotte M Baker
(74) Attorney, Agent, or Firm — Conley Rose, P.C.

(57) ABSTRACT

A fingerprint recognition method and an electronic device are provided. The method includes collecting a touch image in a fingerprint collection region of the fingerprint recognition sensor; configuring a correspondence list; determining whether the touch image is consistent with a pre-stored fingerprint sample; and if the touch image is consistent with the pre-stored fingerprint sample, executing a first preset action corresponding to the fingerprint sample; or if the touch image is inconsistent with the pre-stored fingerprint sample, determining whether the touch image meets a preset condition; and if the touch image meets the preset condition, executing a second preset action, calculating a quantity of times of continuously executing the second action, and if the quantity of times of continuously executing the second preset action is greater than or equal to a third preset value, locking the electronic device within a preset time.

12 Claims, 6 Drawing Sheets

(58) Field of Classification Search
USPC ........ 382/125, 124, 115, 225, 257; 715/847, 715/863; 340/5.53, 5.83
See application file for complete search history.

(56) References Cited

U.S. PATENT DOCUMENTS

| | | |
|---|---|---|
| 2009/0161924 A1 | 6/2009 | Lu et al. |
| 2013/0263282 A1 | 10/2013 | Yamada et al. |
| 2015/0026479 A1 | 1/2015 | Yi et al. |
| 2016/0011767 A1* | 1/2016 | Jung .................... G06F 3/0488 715/847 |

FOREIGN PATENT DOCUMENTS

| | | |
|---|---|---|
| CN | 101197665 A | 6/2008 |
| CN | 104142742 A | 11/2014 |
| CN | 104375680 A | 2/2015 |
| CN | 104391635 A | 3/2015 |
| CN | 104793788 A | 7/2015 |
| JP | 2013205932 A | 10/2013 |

OTHER PUBLICATIONS

Machine Translation and Abstract of Chinese Publication No. CN104375680, Feb. 25, 2015, 14 pages.
Machine Translation and Abstract of Chinese Publication No. CN104793788, Jul. 22, 2015, 30 pages.
Foreign Communication From A Counterpart Application, PCT Application No. PCT/CN2016/070324, English Translation of International Search Report dated Sep. 26, 2016, 2 pages.
Foreign Communication From a Counterpart Application, PCT Application No. PCT/CN2016/070324, English Translation of Written Opinion dated Sep. 26, 2016, 4 pages.
Foreign Communication From A Counterpart Application, Japanese Application No. 2018-522925, Japanese Office Action dated May 21, 2019, 4 pages.
Foreign Communication From A Counterpart Application, Japanese Application No. 2018-522925, English Translation of Japanese Office Action dated May 21, 2019, 4 pages.
Machine Translation and Abstract of Chinese Publication No. CN1696960, Nov. 16, 2005, 15 pages.
Machine Translation and Abstract of Chinese Publication No. CN1753524, Mar. 29, 2006, 13 pages.
Machine Translation and Abstract of Chinese Publication No. CN104391635, Mar. 4, 2015, 18 pages.
Foreign Communication From a Counterpart Application, Chinese Application No. 201680075894.8, Chinese Office Action dated Sep. 3, 2019, 12 pages.

* cited by examiner

FINGERPRINT RECOGNITION METHOD AND ELECTRONIC DEVICE

CROSS-REFERENCE TO RELATED APPLICATIONS

This application is a national stage of International Application No. PCT/CN2016/070324, filed on Jan. 6, 2016, which is hereby incorporated by reference in its entirety.

TECHNICAL FIELD

The present disclosure relates to the fingerprint recognition field, and in particular, to a fingerprint recognition method and an electronic device.

BACKGROUND

A smartphone plays an increasingly important role in people's life. With popularization of the smartphone, a decline in a component value, and improvement of technologies, a fingerprint function gradually changes from a selling point of a high-end machine to a "standard configuration" of the smartphone, and a fingerprint recognition sensor that is configured to recognize a fingerprint is generally at a back or a side of the smartphone.

For a fingerprint function in the prior art, to clearly remind a user of a failure of a current operation when a fingerprint recognition error occurs, a smartphone prompts the user by means of vibration when a fingerprint recognition error occurs, so as to prevent the user from having an illusion that there is no response to the fingerprint.

It may be learned that, the smartphone in the prior art prompts the user by means of vibration as long as a fingerprint recognition error is determined, but cannot distinguish between specific cases of fingerprint recognition errors. Therefore, power consumption of vibration of the smartphone is increased, and a standby time length of the smartphone is affected.

SUMMARY

The present disclosure provides a fingerprint recognition method and an electronic device that can effectively reduce vibration caused by an accidental touch.

A first aspect of the embodiments of the present disclosure provides a fingerprint recognition method, used for an electronic device having a fingerprint recognition sensor, and the method includes collecting, by the electronic device, a touch image in a fingerprint collection region of the fingerprint recognition sensor, where the touch image includes a correct fingerprint touch image, a wrong fingerprint touch image, and/or a non-fingerprint touch image, the correct fingerprint touch image is consistent with a pre-stored fingerprint sample, the correct fingerprint touch image is a touch image that is pre-entered into the electronic device, and the wrong fingerprint touch image is a touch image that is not entered into the electronic device; and if the electronic device determines that the collected touch image is the correct fingerprint touch image, executing, by the electronic device, a first preset action corresponding to the fingerprint sample; or if the electronic device determines that the collected touch image is the wrong fingerprint touch image or the non-fingerprint touch image, determining, by the electronic device, whether the touch image meets a preset condition, where the preset condition is that a coverage area of the touch image is greater than or equal to a first preset value and image quality of the touch image is greater than or equal to a second preset value, and the coverage area is an area covered by the touch image in the fingerprint collection region; and if the electronic device determines that the touch image meets the preset condition, determining, by the electronic device, that the touch image is the wrong fingerprint touch image, and executing, by the electronic device, a second preset action, where the second preset action is used to indicate that the touch image is inconsistent with the fingerprint sample; or if the electronic device determines that the touch image does not meet the preset condition, determining, by the electronic device, that the touch image is the non-fingerprint touch image, and executing, by the electronic device, no action.

A fingerprint touch image and a non-fingerprint touch image can be effectively distinguished using the fingerprint recognition method in this embodiment, accuracy of distinguishing the non-fingerprint touch image is ensured, and it ensures that the electronic device does not consume power to notify the non-fingerprint touch image to a user when the electronic device determines that the touch image is the non-fingerprint touch image.

Because most non-fingerprint touch images can be accurately distinguished using the fingerprint recognition method in this embodiment, when the electronic device detects a non-fingerprint touch image, the electronic device does not vibrate, so that power consumed for vibration is saved, and a standby time length of the electronic device is effectively extended.

With reference to the first aspect of the embodiments of the present disclosure, in a first implementation of the first aspect of the embodiments of the present disclosure, the method further includes determining, by the electronic device, a target touch image set, where the target touch image set includes multiple pre-stored target touch images that are consistent with the fingerprint sample; determining, by the electronic device, coverage areas and image quality of all the target touch images in the target touch image set; and determining, by the electronic device, a minimum value of the coverage areas of all the target touch images in the target image set as the first preset value.

With reference to the first aspect of the embodiments of the present disclosure, in a second implementation of the first aspect of the embodiments of the present disclosure, the electronic device configures a correspondence list, where the correspondence list includes at least one fingerprint sample, and the correspondence list further includes correspondences between different fingerprint samples and different first preset actions.

With reference to the first aspect of the embodiments of the present disclosure or the second implementation of the first aspect of the embodiments of the present disclosure, in a third implementation of the first aspect of the embodiments of the present disclosure, the first preset action is one or more of the following: unlocking, running an application program, paying, or dialing a phone number.

Specifically, the correspondence list includes a correspondence between a fingerprint sample A and unlocking, and/or the correspondence list includes a correspondence between a fingerprint sample B and running an application program, and/or the correspondence list includes a correspondence between a fingerprint sample C and paying, and/or the correspondence list includes a correspondence between a fingerprint sample D and dialing a phone number.

Optionally, if a touch image that is input by the user and collected by the fingerprint recognition sensor is consistent with the fingerprint sample A, the electronic device can be immediately unlocked.

Optionally, if a touch image that is input by the user and collected by the fingerprint recognition sensor is consistent with the fingerprint sample B, the electronic device can execute a corresponding application program.

Specifically, if the electronic device receives, in a standby state, a touch image input by the user, and the touch image is corresponding to the fingerprint sample B for executing an application program, the electronic device directly executes the corresponding application program without receiving an unlocking instruction input by the user.

Specifically, as long as the electronic device receives, in a normal use state, a touch image input by the user, and the touch image is corresponding to the fingerprint sample B for executing an application program, the electronic device can directly execute the corresponding application program without a need of touching an icon corresponding to the application program by the user.

It may be learned that, operation steps can be effectively reduced by directly running an application program using a touch image, and efficiency of running the application program is improved.

Optionally, if the touch image that is input by the user and collected by the fingerprint recognition sensor is consistent with the fingerprint sample C, the electronic device can immediately execute a payment operation.

Optionally, if the electronic device receives, in a standby state, a touch image input by the user, and the touch image is corresponding to the fingerprint sample D for dialing a phone number, the electronic device can directly dial a corresponding phone number without receiving an unlocking instruction input by the user.

Optionally, as long as the electronic device receives, in a normal use state, a touch image input by the user, and the touch image is corresponding to the fingerprint sample D for dialing a phone number, the electronic device can directly dial a phone number without a need of opening a phonebook or entering a phone number by the user.

It may be learned that, operation steps can be effectively reduced by directly dialing a phone number using a touch image, and dialing efficiency is improved.

With reference to the first aspect of the embodiments of the present disclosure, in a fourth implementation of the first aspect of the embodiments of the present disclosure, the method further includes, if a quantity of times of continuously executing the second preset action by the electronic device is greater than or equal to a third preset value, locking the electronic device within a preset time.

With reference to the first aspect of the embodiments of the present disclosure or the fourth implementation of the first aspect of the embodiments of the present disclosure, in a fifth implementation of the first aspect of the embodiments of the present disclosure, the second preset action is vibration and/or making an alert sound.

In this embodiment, when the electronic device determines that the touch image is a wrong fingerprint touch image, the electronic device may vibrate and/or make an alert sound, so that the user can determine that the input fingerprint image is wrong according to the vibration and/or the alert sound.

The electronic device does not count for a non-fingerprint touch image, that is, the non-fingerprint touch image does not trigger locking of the electronic device. Therefore, even though the electronic device continuously collects a non-fingerprint touch image, the electronic device does not perform a locking operation, and the user can normally use the electronic device without waiting for a locking time for locking the electronic device caused by the non-fingerprint touch image to expire.

A second aspect of the embodiments of the present disclosure provides an electronic device, and the electronic device includes a fingerprint recognition sensor, and includes a collection unit configured to collect a touch image in a fingerprint collection region of the fingerprint recognition sensor; a first judgment unit configured to determine whether the touch image is consistent with a pre-stored fingerprint sample; a first execution unit configured to, if the touch image is consistent with the pre-stored fingerprint sample, execute a first preset action corresponding to the fingerprint sample; a second judgment unit configured to, if the touch image is inconsistent with the pre-stored fingerprint sample, determine whether the touch image meets a preset condition, where the preset condition is that a coverage area of the touch image is greater than or equal to a first preset value and image quality of the touch image is greater than or equal to a second preset value, and the coverage area is an area covered by the touch image in the fingerprint collection region; a second execution unit configured to, if the touch image meets the preset condition, execute a second preset action, where the second preset action is used to indicate that the touch image is inconsistent with the fingerprint sample; and a first determining unit configured to, if the touch image does not meet the preset condition, execute no action.

With reference to the second aspect of the embodiments of the present disclosure, in a first implementation of the second aspect of the embodiments of the present disclosure, the electronic device further includes a second determining unit configured to determine a target touch image set, where the target touch image set includes multiple pre-stored target touch images that are consistent with the fingerprint sample; a third determining unit configured to determine coverage areas and image quality of all the target touch images in the target touch image set; a fourth determining unit configured to determine a minimum value of the coverage areas of all the target touch images in the target image set as the first preset value; and a fifth determining unit configured to determine a minimum value of the image quality of all the target touch images in the target image set as the second preset value.

With reference to the second aspect of the embodiments of the present disclosure, in a second implementation of the second aspect of the embodiments of the present disclosure, the electronic device further includes a configuration unit configured to configure a correspondence list, where the correspondence list includes one fingerprint sample, and the correspondence list further includes a correspondence between the fingerprint sample and the first preset action, or the correspondence list includes at least two fingerprint samples, and the correspondence list further includes correspondences between different fingerprint samples and different first preset actions.

With reference to the second aspect of the embodiments of the present disclosure or the second implementation of the second aspect of the embodiments of the present disclosure, in a third implementation of the second aspect of the embodiments of the present disclosure, the first preset action is one or more of the following: unlocking, running an application program, paying, or dialing a phone number.

With reference to the second aspect of the embodiments of the present disclosure, in a fourth implementation of the second aspect of the embodiments of the present disclosure, the electronic device further includes a third execution unit configured to, if a quantity of times of continuously executing the second preset action is greater than or equal to a third preset value, lock the electronic device within a preset time.

With reference to the second aspect of the embodiments of the present disclosure or the fourth implementation of the second aspect of the embodiments of the present disclosure, in a fifth implementation of the second aspect of the embodiments of the present disclosure, the second preset action is vibration and/or making an alert sound.

A third aspect of the embodiments of the present disclosure provides an electronic device, including a fingerprint recognition sensor and a processor, where the fingerprint recognition sensor includes a fingerprint collection region; the processor is configured to collect a touch image in the fingerprint collection region of the fingerprint recognition sensor; and the processor is further configured to determine whether the touch image is consistent with a pre-stored fingerprint sample; and if the touch image is consistent with the pre-stored fingerprint sample, execute a first preset action corresponding to the fingerprint sample; or if the touch image is inconsistent with the pre-stored fingerprint sample, determine whether the touch image meets a preset condition, where the preset condition is that a coverage area of the touch image is greater than or equal to a first preset value and image quality of the touch image is greater than or equal to a second preset value, and the coverage area is an area covered by the touch image in the fingerprint collection region; and if the touch image meets the preset condition, execute a second preset action, where the second preset action is used to indicate that the touch image is inconsistent with the fingerprint sample; or if the touch image does not meet the preset condition, execute no action.

With reference to the third aspect of the embodiments of the present disclosure, in a first implementation of the third aspect of the embodiments of the present disclosure, the processor is further configured to determine a target touch image set, where the target touch image set includes multiple pre-stored target touch images that are consistent with the fingerprint sample; the processor is further configured to determine coverage areas and image quality of all the target touch images in the target touch image set; the processor is further configured to determine a minimum value of the coverage areas of all the target touch images in the target image set as the first preset value; and the processor is further configured to determine a minimum value of the image quality of all the target touch images in the target image set as the second preset value.

With reference to the first implementation of the third aspect of the embodiments of the present disclosure, in a second implementation of the third aspect of the embodiments of the present disclosure, the processor is further configured to configure a correspondence list, where the correspondence list includes one fingerprint sample, and the correspondence list further includes a correspondence between the fingerprint sample and the first preset action, or the correspondence list includes at least two fingerprint samples, and the correspondence list further includes correspondences between different fingerprint samples and different first preset actions.

With reference to the third aspect of the embodiments of the present disclosure or the second implementation of the third aspect of the embodiments of the present disclosure, in a third implementation of the third aspect of the embodiments of the present disclosure, the first preset action is one or more of the following: unlocking, running an application program, paying, or dialing a phone number. With reference to the third aspect of the embodiments of the present disclosure, in a fourth implementation of the third aspect of the embodiments of the present disclosure, the processor is further configured to, if a quantity of times of continuously executing the second preset action is greater than or equal to a third preset value, lock the electronic device within a preset time.

With reference to the third aspect of the embodiments of the present disclosure or the fourth implementation of the third aspect of the embodiments of the present disclosure, in a fifth implementation of the third aspect of the embodiments of the present disclosure, the second preset action is vibration and/or making an alert sound.

The embodiments of the present disclosure provide the fingerprint recognition method and the electronic device. The method includes collecting the touch image; if the touch image is inconsistent with the pre-stored fingerprint sample, determining whether the touch image meets the preset condition, where the preset condition is that the coverage area of the touch image is greater than or equal to the first preset value and the image quality of the touch image is greater than or equal to the second preset value; and if the touch image meets the preset condition, executing the second preset action; or if the touch image does not meet the preset condition, executing no action. Using the fingerprint recognition method in the embodiments, the electronic device notifies, by executing the second preset action, a touch image that meets the preset condition to the user, and does not consume power to notify a touch image that does not meet the preset condition to the user, so that power consumed by the electronic device is effectively reduced, and a standby time length of the electronic device is effectively extended.

DESCRIPTION OF EMBODIMENTS

Figure 1:
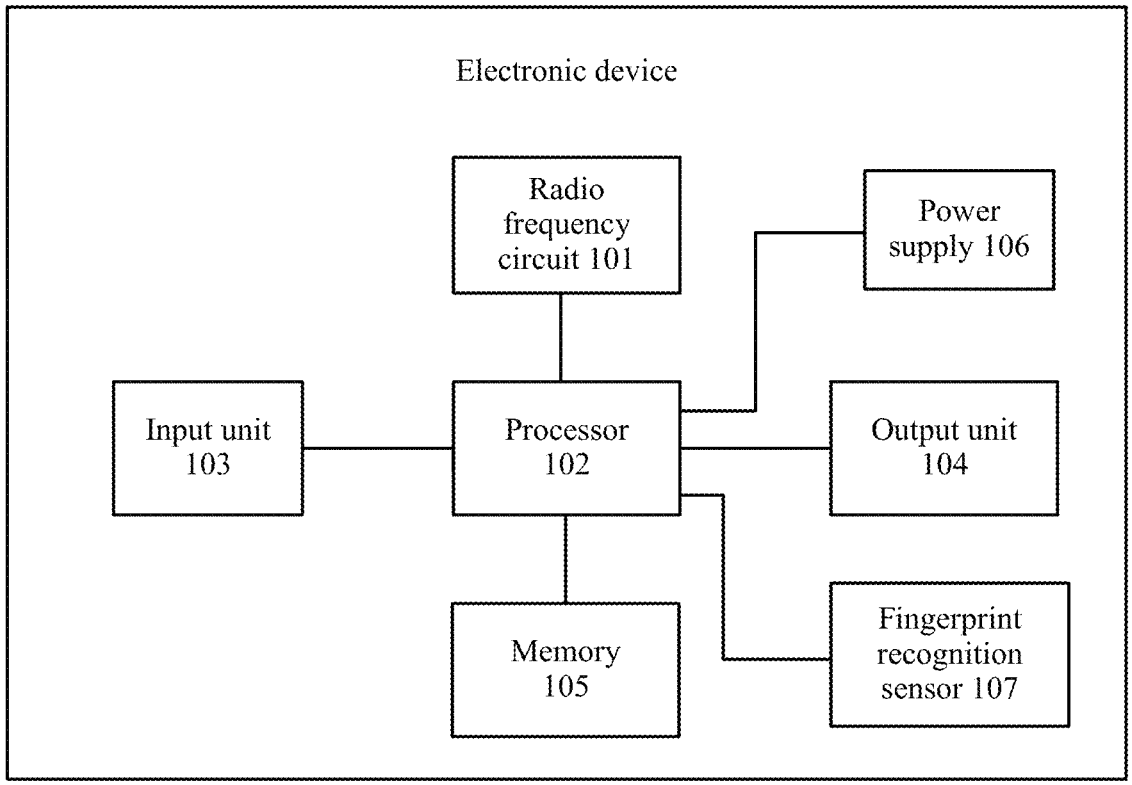
FIG. 1 is a schematic diagram of a hardware structure of an electronic device according to an embodiment of the present disclosure.

An electronic device provided in embodiments of the present disclosure may be implemented in various manners. For example, the electronic device described in the embodiments of the present disclosure may be a mobile terminal, including a smartphone, a wearable device, a notebook computer, a digital broadcasting receiver, a personal digital assistant (PDA), a tablet computer (PAD), a portable multimedia player (PMP), a navigation apparatus, and the like.

The electronic device described in the embodiments of the present disclosure may also be a fixed terminal, such as a digital TV and a desktop computer.

The electronic device in the embodiments can recognize a touch image input by a user. The touch image is an image formed by touching a fingerprint collection region of a fingerprint recognition sensor by an object. The touch image may be a correct fingerprint touch image, that is, a fingerprint touch image that may match a fingerprint sample pre-stored in the electronic device, for example, the electronic device may be unlocked using the fingerprint touch image; alternatively, the touch image may be a wrong fingerprint touch image or a non-fingerprint touch image.

If the electronic device can correctly recognize the touch image, it indicates that the touch image collected by the electronic device is a correct fingerprint touch image, and the electronic device can perform a corresponding operation, such as unlocking, running an application program, paying, and dialing a phone number.

If the electronic device cannot correctly recognize the touch image input by the user, there are two cases for the touch image. One case is that the touch image input by the user is a wrong fingerprint touch image; and the other case is an accidental touch, that is, the touch image collected by the electronic device is a non-fingerprint touch image.

Specifically, the electronic device collects a touch image using the fingerprint recognition sensor that is disposed on the electronic device. In addition, a surface of the fingerprint recognition sensor is relatively shallow, and therefore an accidental touch is likely to occur.

An accidental touch scenario includes that a leg, an arm, a palm, a back of a hand, or another object that may trigger an accidental touch accidentally touch the fingerprint collection region of the fingerprint recognition sensor.

If the electronic device vibrates or makes an alert sound to prompt the user in an accidental touch case, power consumption of the electronic device is increased, and a standby time length of the electronic device is affected.

However, the electronic device provided in the embodiments of the present disclosure does not vibrate or make an alert sound to prompt the user in an accidental touch case, so that power consumption of the electronic device is reduced, and a standby time length of the electronic device is extended.

The following uses an example in which the electronic device provided in the embodiments of the present disclosure is a smartphone for description. A hardware structure of the electronic device provided in the embodiments of the present disclosure is described first with reference to FIG. 1.

The electronic device includes components such as an antenna 101, a processor 102, an input unit 103, an output unit 104, a memory 105, a power supply 106, and a fingerprint recognition sensor 107.

These components communicate with each other using one or more buses.

Persons skilled in the art may understand that the structure of the electronic device shown in the figure does not constitute a limitation on the present disclosure. The structure may not only be a bus structure, but may also be a star structure, and may further include more or fewer components than those shown in the figure, or combine some components, or have different component arrangements.

The input unit 103 is configured to implement interaction between a user and the electronic device and/or information input to the electronic device.

For example, the input unit 103 may receive digits or character information input by the user, or the input unit 103 may receive a press operation input by the user, or the like, so that the input unit 103 generates signal input related to user setting or function control.

In a specific implementation of the present disclosure, the input unit 103 may be a touch panel, or may be another human-machine interaction interface, such as a substantive input key or a microphone, or may be another external information obtaining apparatus, such as a camera.

The touch panel, also referred to as a touchscreen or a touch control screen, may collect a touch operation on or near the touch panel, for example, an operation action performed by the user on the touch panel or near the touch panel using any proper object or accessory such as a finger or a stylus, and drive a corresponding connected apparatus according to a preset program.

Optionally, the touch panel may include two parts: a touch detection apparatus and a touch controller.

The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then transmits the touch point coordinates to the processor 102.

The touch controller may further receive and execute a command sent by the processor 102.

In addition, the touch panel may be implemented in multiple types, such as a resistive type, a capacitive type, an infrared ray, and a surface acoustic wave.

In another implementation of the present disclosure, the substantive input key used by the input unit 103 may include but is not limited to one or more of a physical keyboard, a function key (for example, a volume control key or an on/off key), a trackball, a mouse, a joystick, or the like. The input unit 103 in a form of a microphone may collect a voice that is input by the user or an environment, and convert the voice into a command that is in a form of an electrical signal and may be executed by the processor 102.

In some other implementations of the present disclosure, the input device 103 may also be sensing components in various types, for example, a Hall component, which is configured to detect a physical quantity of the electronic device, such as a force, a torque, a pressure, a stress, a location, a displacement, a velocity, an acceleration, an angle, an angular velocity, a rotational number, a rotational velocity, and a time at which a working state changes, and converts the physical quantity into power to perform detection and control.

Some other sensing components may include a gravity sensor, a tri-axis accelerometer, a gyroscope, an electronic compass, an ambient light sensor, a proximity sensor, a temperature sensor, a humidity sensor, a pressure sensor, a heart rate sensor, and the like.

The fingerprint recognition sensor 107 is configured to receive the touch image, and the fingerprint recognition sensor 107 can generate a signal related to user setting or a function and input the signal to the processor 102, so that the processor 102 can execute, according to the signal input by the fingerprint recognition sensor 107, an action related to the user setting or the function.

The processor 102 is a control center of the electronic device, is connected to all parts of the entire electronic device using various interfaces and lines, and executes various functions of the electronic device and/or processes data by running or executing a software program and/or a module stored in the memory and by invoking data stored in the memory. The processor 102 may include an integrated circuit (IC), for example, may include a single packaged IC, or may include multiple connected packaged ICs with the same function or different functions.

For example, the processor 102 may include only a central processing unit (CPU), or may be a combination of a CPU, a digital signal processor (DSP), and a control chip (for example, a baseband chip) in a communications unit.

In an implementation of the present disclosure, the CPU may be a single computing core, or may include multiple computing cores.

The radio frequency circuit 101 may be configured to receive and send a signal in an information receiving or sending process or a call process; in particular, after receiving downlink information from a base station, send the downlink information to the processor 180 for processing; and in addition, send designed uplink data to the base station. Generally, the radio frequency circuit includes but is not limited to an antenna, at least one amplifier, a transceiver, a coupler, a low noise amplifier (LNA), a duplexer, and the like. In addition, the radio frequency circuit 110 may further communicate with a network and another device by means of wireless communication.

Optionally, the output unit 104 is configured to output an image and/or a sound.

If the output unit 104 may output an image, the output image may be a text, a picture, and/or a video.

The output unit 104 may include a display panel, for example, a display panel configured in a form of a liquid crystal display (LCD), an organic light-emitting diode (OLED), a field emission display (FED), or the like.

Alternatively, the output unit 104 may include a reflective display, for example, an electrophoretic display, or a display using an interferometric modulation of light technology.

The output unit 104 may include a single display or multiple displays in different sizes.

In a specific implementation of the present disclosure, the touch panel used by the foregoing input unit 103 may also be used as a display panel of the output unit.

For example, after detecting a gesture operation of touching or approaching on the touch panel, the touch panel transmits the gesture operation to the processor 102 to determine a type of the touch image, and then the processor 102 provides a corresponding visual output on the display panel according to the type of the touch image.

In FIG. 1, although the input unit 103 and the output unit 104 are used as two independent parts to implement input and output functions of the electronic device, in some embodiments, the touch panel and the display panel may be integrated to implement the input and output functions of the electronic device.

For example, the output unit 104 may display various graphical user interfaces (GUI) as virtual control parts, including but not limited to a window, a scroll bar, an icon, and a clipboard, so that the user performs an operation in a touch manner.

In a specific implementation of the present disclosure, the output unit 104 includes a filter and an amplifier that are configured to filter and amplify a video that is output by the processor 102. The output unit 104 further includes a digital analog converter, which is configured to convert an audio signal that is output by the processor 102 from a digital format into an analog format.

The memory 105 may be configured to store a software program and a module, and the processor 102 executes various functional applications of the electronic device and implements data processing by running the software program and the module that are stored in the memory 105.

The memory 105 primarily includes a program storage area and a data storage area.

The program storage area may store an operating system, and an application program that is required by at least one function, such as a sound playing program and an image playing program. The data storage area may store data (such as audio data and a phone book) that is created according to use of the electronic device, and the like.

In a specific implementation of the present disclosure, the memory 105 may include a volatile memory, such as a nonvolatile random access memory (NVRAM), a phase change RAM (PRAM), or a magnetoresistive RAM (MRAM), and may further include a non-volatile memory, such as at least one magnetic disk storage component, an electrically erasable programmable read-only memory (EEPROM), or a flash memory component such as an NOR flash memory or a NAND flash memory.

The non-volatile memory stores an operating system and an application program that are executed by the processor 102. The processor 102 loads, from the non-volatile memory, a running program and data to a memory, and stores digital content in a mass storage apparatus. The operating system includes various parts and/or drives that are configured to control and manage a conventional system task, for example, memory management, storage device control, and power management, and facilitate communication between various software and hardware. In an implementation of the present disclosure, the operating system may be an Android system of Google Inc., an iOS system developed by Apple Inc., a Windows operating system developed by Microsoft Corporation, an embedded operating system like Vxworks, or the like.

The application program includes any application installed on the electronic device, and includes but is not limited to a browser, an email, an instant messaging service, word processing, a virtual keyboard, a window widget, encryption, digital copyright management, voice recognition, voice duplication, positioning (such as a function provided by the Global Positioning System), music play, or the like.

The power supply 106 is configured to supply power to different parts of the electronic device to maintain running of the parts. Generally, the power supply 106 may be a built-in battery, such as a common lithium-ion battery or a nickel-hydride battery; or may include an external power supply 106 that directly supplies power to the electronic device, such as an alternating current (AC) adapter.

In some implementations of the present disclosure, the power supply 106 may further be widely defined, for example, may further include a power 106 management system, a charging system, a power 106 fault detection circuit, a power 106 converter or inverter, a power 106 status indicator (such as a light emitting diode), and any other parts related to power generation, management, and distribution of the electronic device.

Figure 2:
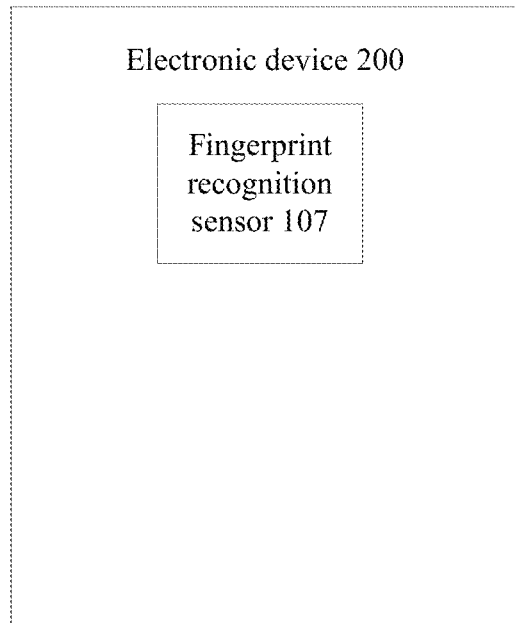
FIG. 2 is a structural schematic diagram of a back of an electronic device according to an embodiment of the present disclosure.

The following describes a specific location of the fingerprint recognition sensor 107 with reference to FIG. 2 using examples. FIG. 2 is a structural schematic diagram of a back of an electronic device according to an embodiment of the present disclosure.

The fingerprint recognition sensor 107 is disposed at the back of the electronic device 200.

Refer to FIG. 1 for a specific hardware structure of the electronic device 200, and details are not described in this embodiment.

It should be noted that, the specific disposition location of the fingerprint recognition sensor 107 is not limited in this embodiment. That the fingerprint recognition sensor 107 is disposed at the back of the electronic device 200 is used as an example for description in this embodiment, and there is no limitation. For example, the fingerprint recognition sensor 107 may also be disposed at any location such as a front or a side of the electronic device 200.

The fingerprint recognition sensor 107 is a dedicated component for obtaining a fingerprint touch image, and is configured to implement automatic collection of the fingerprint touch image and image generation.

Most current fingerprint recognition sensors 107 collect a fingerprint using three main sensing technologies: optical scanning, semiconductor thermosensitive, and a semiconductor capacitor.

The fingerprint recognition sensor 107 may be classified into two types according to a difference in finger touch manners that are used when the fingerprint recognition sensor 107 collects fingerprint data. The first type is a single touch sensor, which requires a finger to perform a reliable touch in a fingerprint collection region; and the second type requires a finger to slide on a surface of the sensor, and the fingerprint recognition sensor 107 obtains fingerprint details by means of scanning or a series of snapshot, obtains a complete fingerprint touch image by means of processing, and may further obtain a finger sliding direction of a user. The fingerprint recognition sensor 107 has multiple advantages such as low production costs, a long service life, low power consumption, and a short response time.

A specific principle of the fingerprint recognition sensor 107 is not described in this embodiment, and for details, refer to the prior art.

Figure 3:
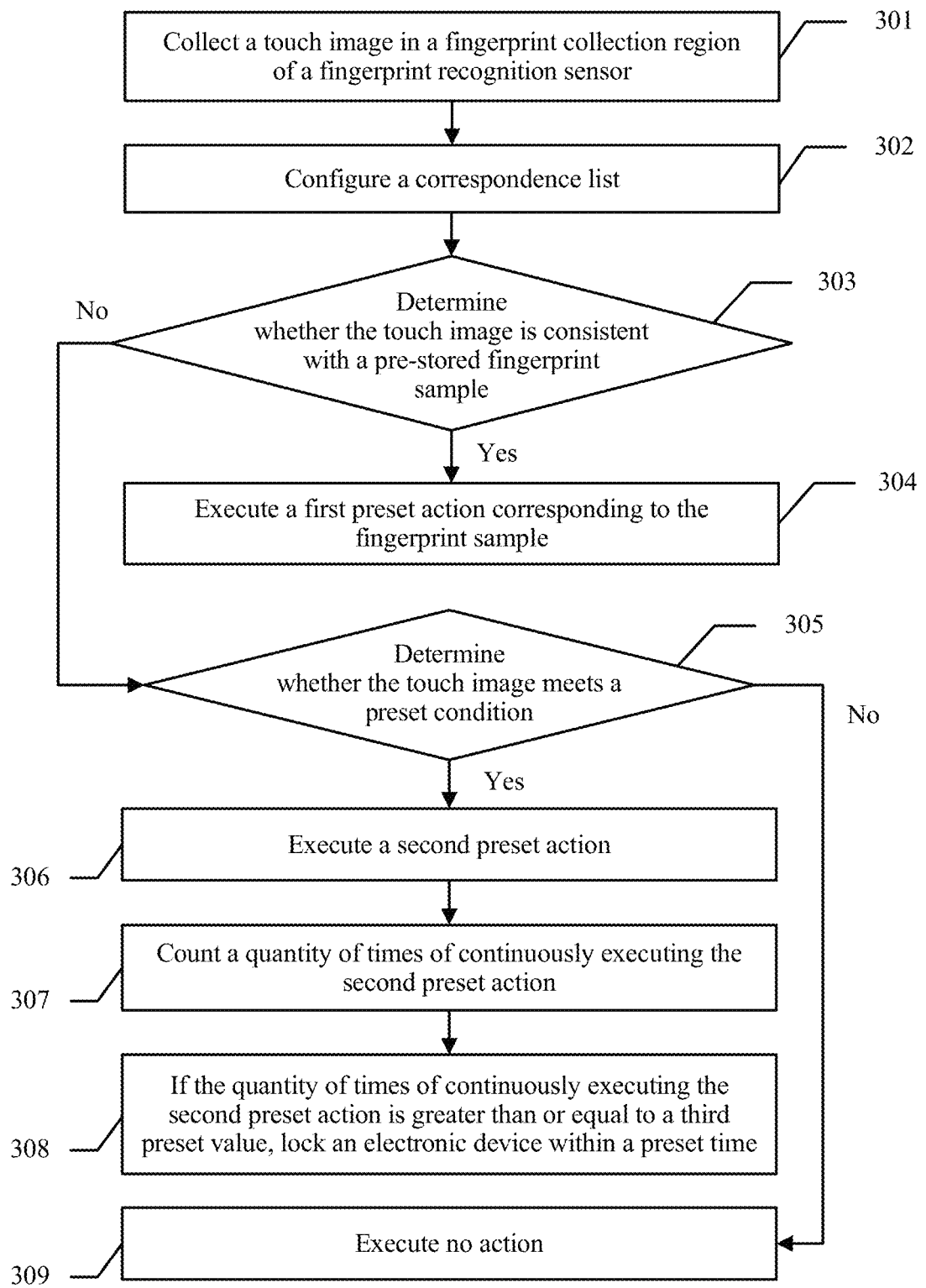
FIG. 3 is a flowchart of steps of a fingerprint recognition method according to an embodiment of the present disclosure.

On the basis of the electronic device shown in FIG. 1 and FIG. 2, the following describes a fingerprint recognition method according to an embodiment of the present disclosure in detail with reference to FIG. 3.

The fingerprint recognition method includes the following steps.

Step 301: Collect a touch image in a fingerprint collection region of the fingerprint recognition sensor.

The touch image in this embodiment may be a fingerprint touch image or a non-fingerprint touch image.

The non-fingerprint touch image may be an image formed by touching the fingerprint collection region of the fingerprint recognition sensor by metal, a pocket, a leg, an arm, a palm, a back of a hand, and any other objects that can trigger an accidental touch.

Step 302: Configure a correspondence list.

Optionally, the correspondence list may include one fingerprint sample, and the correspondence list may further include a correspondence between the fingerprint sample and the first preset action.

For example, the first preset action corresponding to the fingerprint sample may be unlocking, running an application program, paying, or dialing a phone number.

Optionally, the correspondence list may include at least two fingerprint samples, and the correspondence list may further include correspondences between different fingerprint samples and different first preset actions.

Specifically, a one-to-one correspondence between the fingerprint samples and the first preset actions is established in the correspondence list.

A correspondence between one first preset action and multiple fingerprint samples may be further established in the correspondence list.

That a one-to-one correspondence between the fingerprint samples and the first preset actions is established in the correspondence list is used as an example for description.

It should be noted that, an execution time sequence between step 301 and step 302 is not limited in this embodiment.

It should be further noted that, step 302 in this embodiment is an optional step, and this is not limited.

In this embodiment, the electronic device can receive a fingerprint sample input by a user, so that different first preset actions can be executed using different fingerprint samples.

For example, the correspondence list includes a correspondence between a fingerprint sample A and unlocking, and/or the correspondence list includes a correspondence between a fingerprint sample B and running an application program, and/or the correspondence list includes a correspondence between a fingerprint sample C and paying, and/or the correspondence list includes a correspondence between a fingerprint sample D and dialing a phone number.

In this embodiment, the first preset action is an example for description, and is not specifically limited.

Step 303: Determine whether the touch image is consistent with a pre-stored fingerprint sample; and if the touch image is consistent with the pre-stored fingerprint sample, step 304 is executed, or if the touch image is inconsistent with the pre-stored fingerprint sample, step 305 is executed.

In this embodiment, the electronic device can determine whether the collected touch image is consistent with the fingerprint sample stored in the correspondence list.

It should be noted that, in this embodiment, a degree of consistency between the touch image and the fingerprint sample is not limited. For example, the touch image is totally consistent with the fingerprint sample, or a similarity between the touch image and the fingerprint sample is greater than or equal to a preset threshold.

In this embodiment, a value of the preset threshold is not limited, and refer to the prior art for details about how to determine the similarity between the touch image and the fingerprint sample. Details are not described in this embodiment.

Specifically, there may be multiple fingerprint samples in this embodiment.

The electronic device may match the touch image with the fingerprint samples one by one, to specifically determine a fingerprint sample that is consistent with the touch image.

More specifically, the electronic device may generate a fingerprint sample matching list, and the fingerprint sample matching list includes the fingerprint samples, so that the electronic device can perform matching for the touch image one by one according to a sequence in the fingerprint sample matching list.

Specifically, priorities of the fingerprint samples in the fingerprint sample matching list may be arranged according to quantities of times of successful matching for the fingerprint samples.

Step 304: Execute a first preset action corresponding to the fingerprint sample.

Specifically, if the electronic device determines that the current touch image is consistent with the fingerprint sample, the electronic device may execute the first preset action corresponding to the fingerprint sample.

For example, if a touch image that is input by the user and collected by the fingerprint recognition sensor is consistent with the fingerprint sample A, the electronic device can be immediately unlocked.

If a touch image that is input by the user and collected by the fingerprint recognition sensor is consistent with the fingerprint sample B, the electronic device can execute a corresponding application program.

Specifically, the application program corresponding to the fingerprint sample B is not limited in this embodiment, for example, the application program corresponding to the fingerprint sample B may be WeChat, QQ, a browser, and the like.

More specifically, the electronic device may receive an operation instruction input by the user, to establish correspondences between different fingerprint samples and running different application programs.

Optionally, in this embodiment, if the electronic device receives, in a standby state, a touch image input by the user, and the touch image is corresponding to the fingerprint sample B for executing an application program, the electronic device can directly execute the corresponding application program without receiving an unlocking instruction input by the user.

Optionally, in this embodiment, as long as the electronic device receives, in a normal use state, a touch image input by the user, and the touch image is corresponding to the fingerprint sample B for executing an application program, the electronic device can directly execute the corresponding application program without a need of touching an icon corresponding to the application program by the user.

It may be learned that, operation steps can be effectively reduced by directly running an application program using a touch image, and efficiency of running the application program is improved.

Further, if the touch image that is input by the user and collected by the fingerprint recognition sensor is consistent with the fingerprint sample C, the electronic device can immediately execute a payment operation.

Further, if the touch image that is input by the user and collected by the fingerprint recognition sensor is consistent with the fingerprint sample D, the electronic device can immediately execute an operation of dialing a phone number.

Specifically, the electronic device may receive an operation instruction input by the user, to establish correspondences between different fingerprint samples and different phone numbers.

Optionally, in this embodiment, if the electronic device receives, in a standby state, a touch image input by the user, and the touch image is corresponding to the fingerprint sample D for dialing a phone number, the electronic device can directly dial a corresponding phone number without receiving an unlocking instruction input by the user.

Optionally, in this embodiment, as long as the electronic device receives, in a normal use state, a touch image input by the user, and the touch image is corresponding to the fingerprint sample D for dialing a phone number, the electronic device can directly dial a phone number without a need of opening a phonebook or entering a phone number by the user.

It may be learned that, operation steps can be effectively reduced by directly dialing a phone number using a touch image, and dialing efficiency is improved.

Step 305: Determine whether the touch image meets a preset condition; and if the touch image meets the preset condition, step 306 is executed, or if the touch image does not meet the preset condition, step 309 is executed.

To reduce power consumption of the electronic device and improve a standby time length of the electronic device, whether the collected touch image is a fingerprint touch image or a non-fingerprint touch image can be effectively distinguished using step 305 in this embodiment.

That is, whether the collected touch image is a fingerprint touch image or a non-fingerprint touch image can be effectively distinguished according to the preset condition in this embodiment.

Specifically, if it is determined, using step 305, that the collected touch image is a fingerprint touch image, step 306 continues to be executed.

Specifically, if it is determined, using step 305, that the collected touch image is a non-fingerprint touch image, power consumption of the electronic device that is wasted for notifying the non-fingerprint touch image to the user can be effectively avoided using step 309, so that power of the electronic device is saved, and a standby time length of the electronic device is extended.

For example, if an accidental touch occurs, for example, a leg of the user accidentally touches the fingerprint collection region of the fingerprint recognition sensor, the fingerprint recognition sensor detects a touch image, and determines that the touch image is a non-fingerprint touch image according to the preset condition in step 305, so that the electronic device does not notify the non-fingerprint touch image to the user, power consumption caused by notifying the accidental touch case to the user is avoided, wastes of power of the electronic device is reduced, and a standby time length of the electronic device is extended.

It may be learned that, in this embodiment, the fingerprint touch image and the non-fingerprint touch image can be effectively distinguished according to the preset condition. The preset condition is described in detail below.

The preset condition is obtained on the basis of a theoretical analysis for Big Data. For example, the electronic device collects touch images at research and development phases, some of the collected touch images are correct fingerprint touch images, the correct fingerprint touch images are fingerprints successfully entered into the electronic device by the user, and the correct fingerprint touch images can trigger the electronic device to execute the first preset action.

Some of the touch images are wrong fingerprint touch images, the wrong fingerprint touch images are fingerprints that are not entered into the electronic device by the user, and the wrong fingerprint touch images cannot trigger the electronic device to execute the first preset action.

Some of the touch images are non-fingerprint touch images, and the non-fingerprint touch images may be formed by touching the fingerprint collection region by a leg, a palm of a hand, a back of a hand, an arm, or the like of the user.

In this embodiment, the preset condition is that a coverage area of the touch image is greater than or equal to a first preset value and image quality of the touch image is greater than or equal to a second preset value.

The coverage area is an area covered by the touch image in the fingerprint collection region.

That is, if the coverage area of the touch image is less than the first preset value and/or the image quality of the touch image is less than the second preset value, the touch image is likely to be a non-fingerprint touch image.

The electronic device can exclude most non-fingerprint touch images according to the preset condition, so that the electronic device does not consume power to notify the non-fingerprint touch image to the user.

The first preset value and the second preset value are not limited in this embodiment. If the coverage area of the touch image is less than the first preset value and/or the image quality of the touch image is less than the second preset value, it is determined that the touch image is a non-fingerprint touch image. If the coverage area of the touch image is greater than or equal to the first preset value and the image quality of the touch image is greater than or equal to the second preset value, it is determined that the touch image is a fingerprint touch image.

In this embodiment, after the fingerprint recognition sensor collects a touch image, the fingerprint recognition sensor may directly output image quality of the touch image. The fingerprint recognition sensor may determine the image quality of the touch image according to a mean value, a variance, an information entropy, an annular spectrum structure, or the like of the touch image.

Alternatively, the electronic device may collect statistics about feature indicators of the touch image collected by the fingerprint recognition sensor, such as a mean value, a variance, an information entropy, and an annular spectrum structure, and then calculate an image quality score according to all these indicators.

Specifically, a method for determining image quality may be an image quality determining method based on an overall feature. The touch image is considered as a whole, one or more overall features are extracted, and then overall image quality of the input touch image is obtained.

How to obtain the image quality of the touch image is not limited in this embodiment provided that the electronic device can successfully obtain the image quality of the touch image.

For example, the electronic device may collect statistics about feature indicators of the touch image, such as a mean value, a variance, an information entropy, and an annular spectrum structure, and then calculate an image quality score according to all these indicators.

Specifically, a method for determining image quality may be an image quality determining method based on an overall feature. The touch image is considered as a whole, one or more overall features are extracted, and then overall quality of the input touch image is obtained.

The following describes how to determine the first preset value and the second preset value with reference to accompanying drawings using examples.

Figure 4:
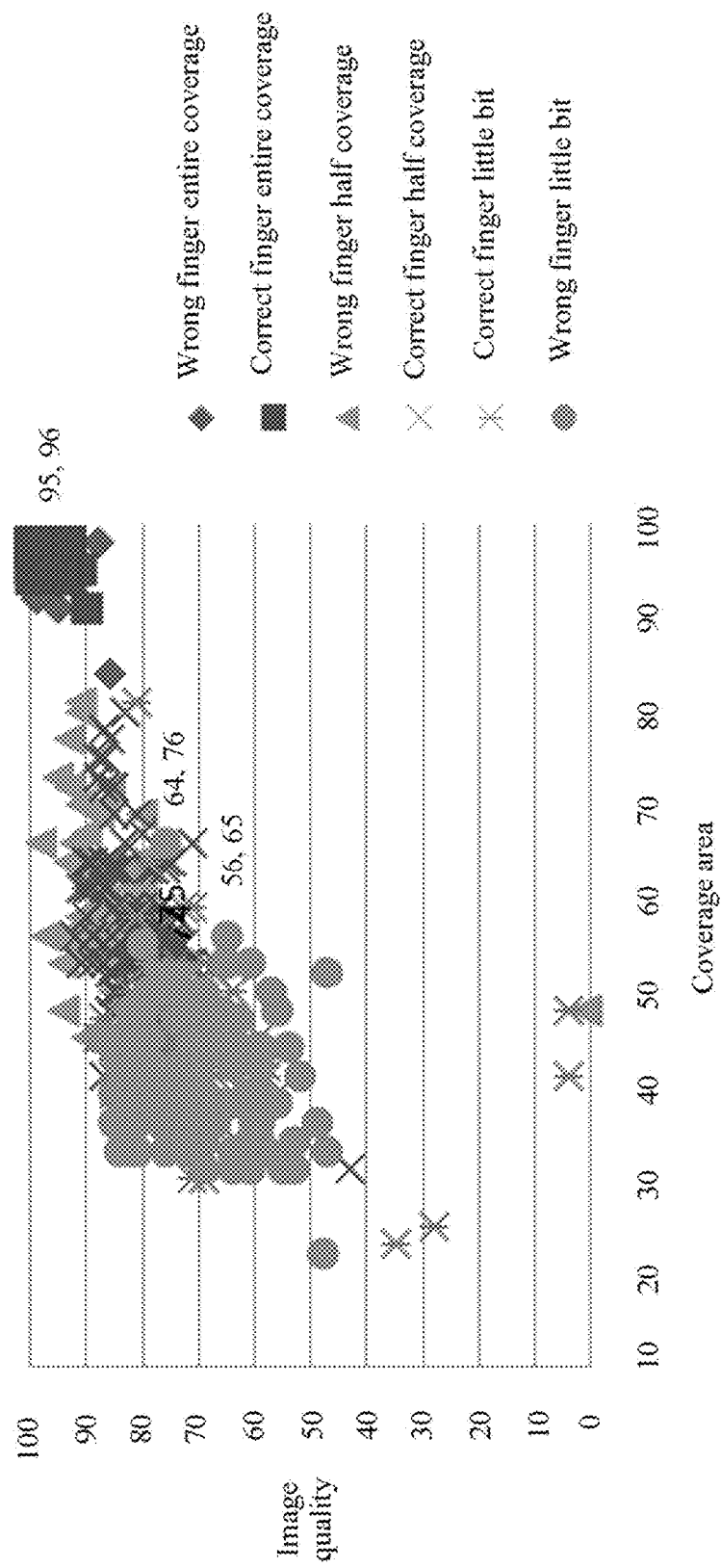
FIG. 4 is a schematic diagram of a comparison between a correct fingerprint touch image and a wrong fingerprint touch image according to an embodiment of the present disclosure.

It may be learned from FIG. 4 that, FIG. 4 is a schematic diagram of a comparison between a correct fingerprint touch image and a wrong fingerprint touch image.

A horizontal coordinate of a coordinate system shown in FIG. 4 is an area covered by a fingerprint touch image in the fingerprint collection region of the fingerprint recognition sensor. A horizontal coordinate 100 indicates that the fingerprint touch image covers the entire fingerprint collection region, a horizontal coordinate 50 indicates that the fingerprint touch image covers a half area of the fingerprint collection region, and other data on the horizontal coordinate is obtained by analogy. Details are not described.

A vertical coordinate of the coordinate system shown in FIG. 4 is image quality of the fingerprint touch image.

Correct finger entire coverage shown in FIG. 4 indicates that a correct fingerprint touch image covers the entire fingerprint collection region of the fingerprint recognition sensor; wrong finger entire coverage indicates that a wrong fingerprint touch image covers the entire fingerprint collection region of the fingerprint recognition sensor.

It may be learned from FIG. 4 that, distribution tendencies of the correct fingerprint touch image and the wrong fingerprint touch image in the coordinate system in FIG. 4 are almost consistent.

That is, distribution tendencies of the correct fingerprint touch image and the wrong fingerprint touch image that have the same coverage area in the coordinate system in FIG. 4 are almost consistent.

Figure 5:
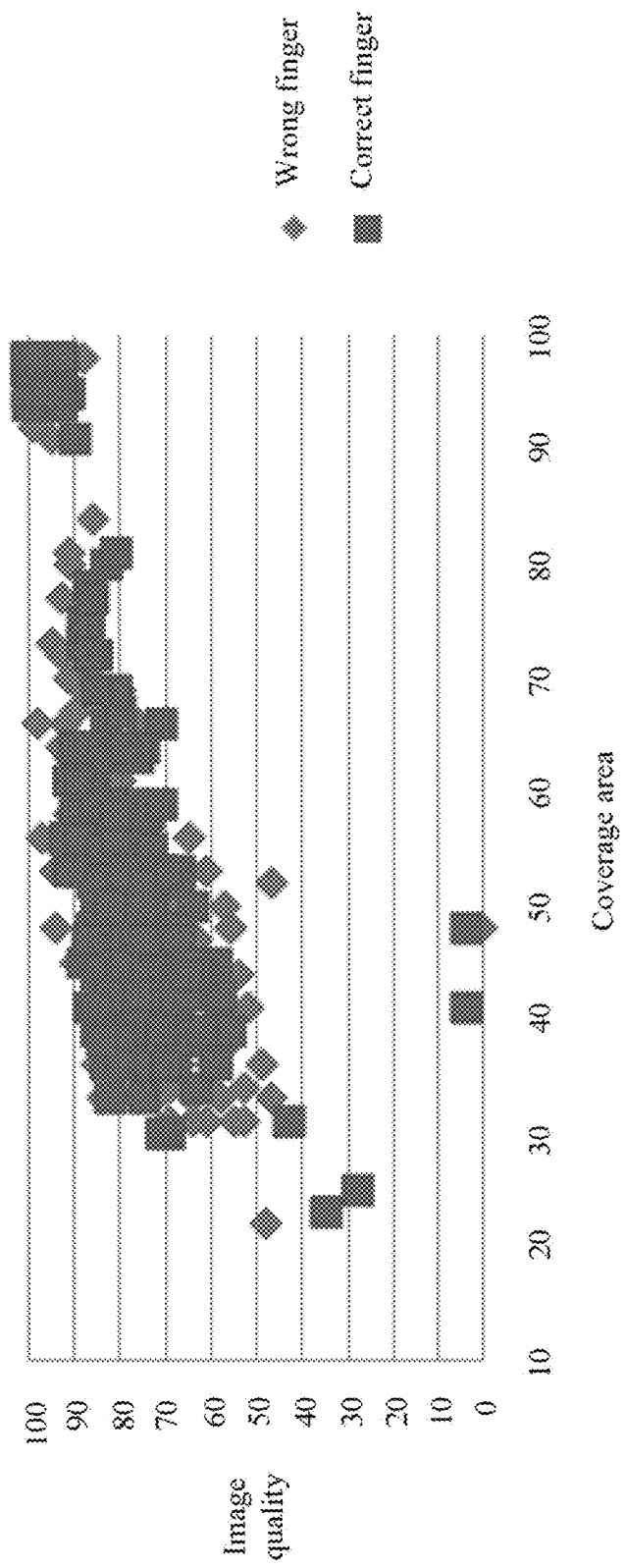
FIG. 5 is a schematic diagram of a comparison between a correct fingerprint touch image and a wrong fingerprint touch image according to another embodiment of the present disclosure.

FIG. 4 is a schematic diagram of a comparison between a correct fingerprint touch image and a wrong fingerprint touch image in different coverage areas, and FIG. 5 is a schematic diagram of a comparison between a correct fingerprint touch image and a wrong fingerprint touch image in the same coverage area.

Refer to FIG. 4 for specific descriptions of a coordinate system shown in FIG. 5, and details are not described in this embodiment. In addition, a correct finger shown in FIG. 5 is a correct fingerprint touch image, and a wrong finger is a wrong fingerprint touch image.

It may be learned from FIG. 5 that, distribution tendencies of a correct fingerprint touch image and a wrong fingerprint touch image in the same coverage area are almost consistent.

It may be learned from FIG. 4 and FIG. 5 that, distribution of a wrong fingerprint touch image and distribution of a correct fingerprint touch image in a coordinate system in which a horizontal coordinate is a coverage area and a vertical coordinate is image quality tend to be consistent.

Figure 6:
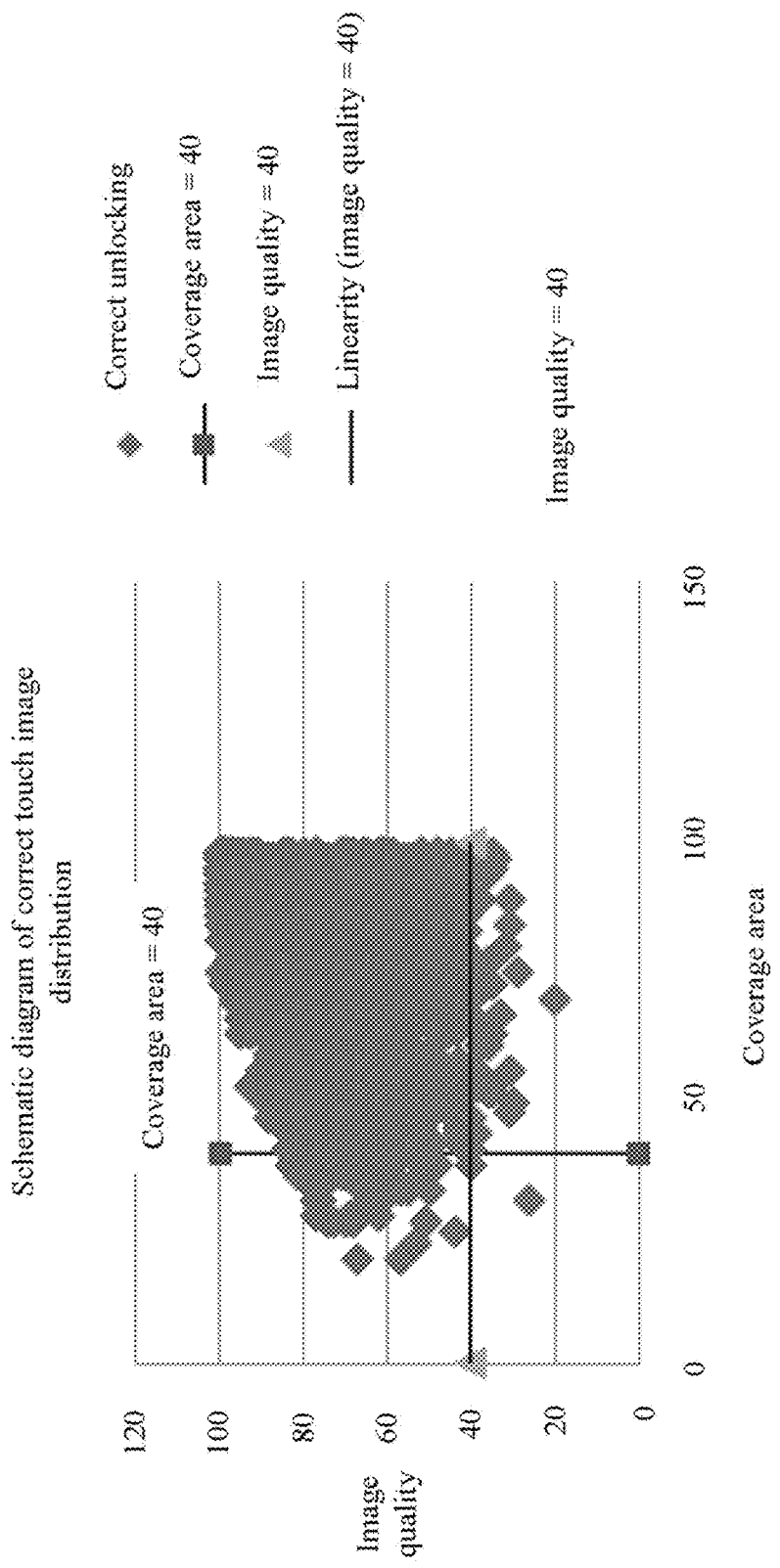
FIG. 6 is a schematic diagram of distribution of a touch image according to an embodiment of the present disclosure.

On the basis of FIG. 4 and FIG. 5, further, refer to FIG. 6 below. That the first preset action is unlocking is used as an example in FIG. 6. FIG. 6 is a schematic diagram of distribution of collected correct fingerprint touch images that can be used to unlock an electronic device. A target touch image set is a touch image set determined according to collected correct fingerprint touch images. Optionally, the target touch image set may be determined according to the schematic diagram of distribution of the correct fingerprint touch images, for example, correct fingerprint touch images whose coverage areas are greater than 40 and image quality is greater than 40 in FIG. 6 are determined as the target touch image set.

In this embodiment, as shown in FIG. 6, 99% of target touch images may be included in the target touch image set. That is, the target touch image set includes most of the target touch images.

The electronic device determines coverage areas and image quality of all the target touch images in the target touch image set.

The electronic device determines the first preset value according to the coverage areas of the target touch images in the target image set. For example, the electronic device may determine a minimum value of the coverage areas of all the target touch images in the target image set as the first preset value.

The electronic device determines the second preset value according to the image quality of all the target touch images in the target image set. For example, the electronic device may determine a minimum value of the image quality of all the target touch images in the target image set as the second preset value.

It may be learned from FIG. 6 that, the minimum value of the coverage areas of all the target touch images in the target image set is the first preset value, and the first preset value is 40.

The minimum value of the image quality of all the target touch images in the target image set is the second preset value, and the second preset value is 40.

It may be learned that, most target touch images that can be used to successfully unlock the electronic device are distributed in areas in which horizontal coordinates are greater than or equal to 40 and vertical coordinates are greater than or equal to 40 in the coordinate system.

It can be learned from FIG. 4 and FIG. 5 that distribution of the wrong fingerprint touch image and distribution of the correct fingerprint touch image tend to be consistent in the coordinate system whose horizontal coordinate is a coverage area and vertical coordinate is image quality. Therefore, most wrong fingerprint recognition images are also distributed in the areas in which the horizontal coordinates are greater than or equal to 40 and the vertical coordinates are greater than or equal to 40 in the coordinate system.

Therefore, in this embodiment, the first preset value is equal to the second preset value, and both the first preset value and the second preset value are 40.

It may be learned that, when a coverage area of a touch image is greater than or equal to 40 and image quality is greater than or equal to 40, the touch image is likely to be a fingerprint touch image.

When a coverage area of a touch image is less than 40 and/or image quality is less than 40, the touch image is likely to be a non-fingerprint touch image, that is, an accidental touch occurs on the fingerprint recognition sensor of the electronic device.

The first preset value and the second preset value in this embodiment are merely reference values, and are not used as a limitation. For different products, and in different use states, the first preset value and the second preset value may both be different.

It may be learned that, whether the touch image is a fingerprint touch image or a non-fingerprint touch image can be distinguished according to the preset condition in this embodiment.

Step 306: Execute a second preset action.

In this embodiment, the second preset action is used to indicate that the touch image is inconsistent with the fingerprint sample.

Specifically, the second preset action in this embodiment is vibration and/or making an alert sound.

More specifically, when the electronic device determines that the touch image is a wrong fingerprint touch image, the electronic device may vibrate and/or make an alert sound, so that the user can determine that the input fingerprint image is wrong according to the vibration and/or the alert sound.

Step 307: Count a quantity of times of continuously executing the second preset action.

In this embodiment, a timer is disposed on the electronic device, and the timer can count when the electronic device executes the second preset action.

Step 308: If the quantity of times of continuously executing the second preset action is greater than or equal to a third preset value, lock the electronic device within a preset time.

The third preset value is not limited in this embodiment, and that the third preset value is 5 is used as an example for description in this embodiment.

If the electronic device determines that the quantity of times of continuously executing the second preset action is greater than or equal to 5, that is, a quantity of times of continuously collecting a wrong fingerprint touch image by the electronic device is greater than or equal to 5, the electronic device may be locked, to prevent an illegal user from using the electronic device, so as to further reduce power consumption of collecting a touch image by the electronic device.

The preset time is not limited in this embodiment, and that the preset time is 2 minutes is used as an example for description in this embodiment.

If the preset time expires, return to step 301.

Step 309: Execute no action.

In this embodiment of the present disclosure, if the touch image does not meet the preset condition, the electronic device executes no action. That is, after determining that the touch image does not meet the preset condition, the electronic device does not respond to a result of the determining, that is, does not execute an operation instruction related to the determining operation; or after determining that the touch image does not meet the preset condition, the electronic device does not send a corresponding operation instruction.

In this embodiment, when the electronic device determines that the touch image is the non-fingerprint touch image, the electronic device does not perform any action. That is, the electronic device does not remind the user by means of vibration or an alert sound, and does not count for the non-fingerprint touch image, either. Because the non-fingerprint touch image is generally formed by accident, and an accidental touch is likely to occur, for example, the electronic device in a pocket of the user accidentally touches a leg, an arm, or the like of the user, the electronic device in this embodiment does not remind the user of the non-fingerprint touch image. Therefore, power consumed for reminding the user of the non-fingerprint touch image is saved, and a standby time length of the electronic device is effectively extended.

The following describes beneficial effects of the fingerprint recognition method in FIG. 3 in detail.

The beneficial effects of the fingerprint recognition method in this embodiment are as follows.

1. A fingerprint touch image and a non-fingerprint touch image can be effectively distinguished using the fingerprint recognition method in this embodiment.

The following describes whether the preset condition in this embodiment is effective with reference to a specific application scenario.

It may be learned from the foregoing that, a purpose of effectively distinguishing a fingerprint touch image and a non-fingerprint touch image can be achieved according to an effective preset condition.

Specifically, referring to Table 1, Table 1 is a case in which the electronic device can distinguish a non-fingerprint touch image according to the preset condition. A type in Table 1 is a type of the non-fingerprint touch image, a recognition rate is a probability that the electronic device can distinguish the non-fingerprint touch image according to the preset condition, a recognition error rate is a probability that the electronic device cannot distinguish the non-fingerprint touch image according to the preset condition, and a data quantity is a total quantity of collected non-fingerprint touch images.

TABLE 1

| Type | Recognition rate | Recognition error rate | Data quantity |
| --- | --- | --- | --- |
| Finger | 99.20% | 0.80% | 2077 |
| Leg | 95.1% | 4.9% | 61 |
| Arm | 100% | 0% | 76 |
| Palm | 0% | 100% | 77 |
| Pocket | 94.8% | 5.20% | 77 |
| Back of a hand | 43.80% | 56.20% | 73 |

It may be learned from Table 1 that, the electronic device that uses the recognition method in this embodiment can effectively distinguish a non-fingerprint touch image, and accuracy of distinguishing the non-fingerprint touch image is high.

Referring to Table 2, Table 2 shows a vibration status of an electronic device when the non-fingerprint touch image is a non-skin-type touch image.

Table 2 shows an application scenario in which various non-skin-type materials touch the fingerprint collection region for 20 times, and statistics about a quantity of vibration times of the electronic device is collected.

A first electronic device and a second electronic device in Table 2 are electronic devices that use the fingerprint recognition method in this embodiment, and a third electronic device is an electronic device that does not use the fingerprint recognition method in this embodiment.

TABLE 2

| Material | First electronic device | Second electronic device | Third electronic device |
| --- | --- | --- | --- |
| Metal | 2/20 | 7/20 | 18/20 |
| Peel | 0/20 | 0/20 | 16/20 |
| Cotton with water | 3/20 | 5/20 | 20/20 |
| Paper | 0/20 | 0/20 | 15/20 |

That the non-skin-type material shown in Table 2 is paper is used as an example. When the paper is used to touch the fingerprint collection region for 20 times, a quantity of times of vibration of the first electronic device and the second electronic device is 0, and a quantity of times of vibration of the third electronic device that does not use the fingerprint recognition method in this embodiment is 15. It may be learned that, most non-fingerprint touch images can be accurately distinguished using the fingerprint recognition method in this embodiment.

2. Power consumption of the electronic device can be effectively reduced using the fingerprint recognition method in this embodiment, and a standby time length of the electronic device can be effectively extended.

Because most non-fingerprint touch images can be accurately distinguished using the fingerprint recognition method in this embodiment, when the electronic device detects a non-fingerprint touch image, the electronic device does not vibrate, so that power consumed for vibration is saved, and a standby time length of the electronic device is effectively extended.

To better describe power consumption that can be reduced using the fingerprint recognition method in this embodiment of the present disclosure, a probability of an accidental touch (that is, the electronic device collects a non-fingerprint touch image) for the electronic device is described first in the following.

A touch image input by the user in a process of using the electronic device is collected, a collection time is one month, and 30753 touch images in total are collected.

4461 touch images of the collected 30753 touch images cannot enable the electronic device to execute the first preset action.

Specifically, there are 1929 non-fingerprint touch images in the 4461 touch images.

Therefore, it can be obtained that an average accidental touch rate of the tested user is a quantity of the non-fingerprint touch images/a total quantity of the touch images=1929/30753=6.3%.

It is determined, according to collected data, that a power consumption gain for preventing one accidental touch is 30 milliamps (mA)*10/3600.

After the fingerprint recognition method in this embodiment is used, power consumption reduced by one person per day may be calculated according to the average accidental touch rate of the tested user obtained by means of the foregoing data analysis:

a total quantity of touch images collected per day on average*an average accidental touch rate*a power consumption gain for preventing one accidental touch=N*6.3%*30 mA*10/3600=0.525N/100 mA.

It can be obtained, by means of the foregoing data analysis, that the power consumption gain for preventing one accidental touch using the fingerprint recognition method in this embodiment is 0.525N/100 mA. N indicates a total quantity of touch images collected per day on average.

Optionally, if there are 25 accidental touches per day, a power consumption gain per day is a quantity of times of accidental touches*the power consumption gain for preventing one accidental touch=25*30*10/3600=2 mA.

When there are at least 180 severely accidental touches, a power consumption gain is 180*30*10/3600=15 mA.

It may be learned that, using the fingerprint recognition method in this embodiment, power consumption wasted in a process of reminding the user by means of vibration when the electronic device collects a non-fingerprint touch image can be effectively avoided, and a standby time length of the electronic device can be effectively extended.

3. In the fingerprint recognition method in this embodiment, when the electronic device determines that the quantity of times of continuously executing the second preset action is greater than or equal to the third preset value, the electronic device is locked within a preset time, so that an illegal user is effectively prevented from using the electronic device.

In addition, the electronic device does not count for a non-fingerprint touch image, that is, the non-fingerprint touch image does not trigger locking of the electronic device. Therefore, even though the electronic device continuously collects a non-fingerprint touch image, the electronic device does not perform a locking operation, and the user can normally use the electronic device without waiting for a locking time for locking the electronic device caused by the non-fingerprint touch image to expire.

The following describes in detail a specific hardware structure of an electronic device provided in an embodiment of the present disclosure with reference to FIG. 1 and FIG. 2.

The fingerprint collection region of the fingerprint recognition sensor 107 provided in this embodiment of the present disclosure is further used to collect a touch image in the collection region.

Refer to the embodiments shown in FIG. 1 and FIG. 2 for specific descriptions of the fingerprint recognition sensor 107, and details are not described in this embodiment.

The processor 102 is configured to collect a touch image in the fingerprint collection region of the fingerprint recognition sensor.

The processor 102 is further configured to determine whether the touch image is consistent with a pre-stored fingerprint sample. If the touch image is consistent with the pre-stored fingerprint sample, the processor executes a first preset action corresponding to the fingerprint sample. Or, if the touch image is inconsistent with the pre-stored fingerprint sample, the processor determines whether the touch image meets a preset condition. The preset condition is that a coverage area of the touch image is greater than or equal to a first preset value and image quality of the touch image is greater than or equal to a second preset value, and the coverage area is an area covered by the touch image in the fingerprint collection region. If the touch image meets the preset condition, the processor executes a second preset action, and the second preset action is used to indicate that the touch image is inconsistent with the fingerprint sample. If the touch image does not meet the preset condition, the processor executes no action.

In some other embodiments of the present disclosure, the processor 102 is further configured to configure a correspondence list, where the correspondence list includes at least one fingerprint sample, and the correspondence list further includes correspondences between different fingerprint samples and different first preset actions.

The first preset action is one or more of the following: unlocking, running an application program, paying, or dialing a phone number.

In some other embodiments of the present disclosure, the processor 102 is further configured to, if a quantity of times of continuously executing the second preset action is greater than or equal to a third preset value, lock the electronic device within a preset time.

The second preset action is vibration and/or making an alert sound.

Refer to the embodiment shown in FIG. 3 for details of a specific execution process in which the processor 102 executes the fingerprint recognition method in the embodiments of the present disclosure, and details are not described in this embodiment.

Figure 7:
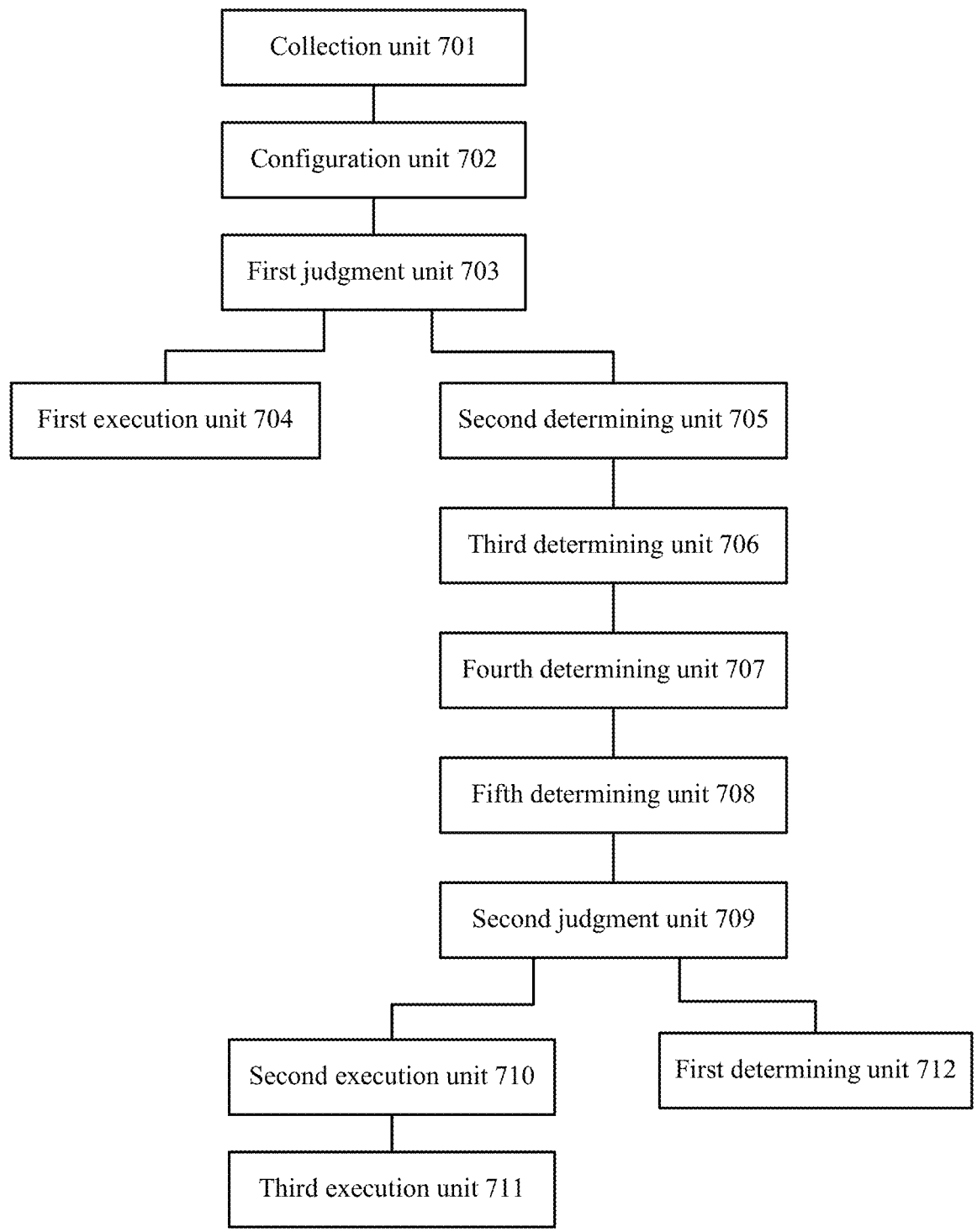
FIG. 7 is a structural block diagram of an electronic device according to an embodiment of the present disclosure.

The following describes in detail a specific structure of an electronic device provided in an embodiment with reference to FIG. 7.

The electronic device includes a collection unit 701 configured to collect a touch image in a fingerprint collection region of the fingerprint recognition sensor; a configuration unit 702 configured to configure a correspondence list, where the correspondence list includes one fingerprint sample, and the correspondence list further includes a correspondence between the fingerprint sample and the first preset action, or the correspondence list includes at least two fingerprint samples, and the correspondence list further includes correspondences between different fingerprint samples and different first preset actions; a first judgment unit 703 configured to determine whether the touch image is consistent with a pre-stored fingerprint sample; a first execution unit 704 configured to, if the touch image is consistent with the pre-stored fingerprint sample, execute the first preset action corresponding to the fingerprint sample, where the first preset action is one or more of the following: unlocking, running an application program, paying, or dialing a phone number; a second determining unit 705 configured to determine a target touch image set, where the target touch image set includes multiple pre-stored target touch images that are consistent with the fingerprint sample; a third determining unit 706 configured to determine coverage areas and image quality of all the target touch images in the target touch image set; a fourth determining unit 707 configured to determine a minimum value of the coverage areas of all the target touch images in the target image set as the first preset value; a fifth determining unit 708 configured to determine a minimum value of the image quality of all the target touch images in the target image set as the second preset value; a second judgment unit 709 configured to, if the touch image is inconsistent with the pre-stored fingerprint sample, determine whether the touch image meets a preset condition, where the preset condition is that a coverage area of the touch image is greater than or equal to the first preset value and image quality of the touch image is greater than or equal to the second preset value, and the coverage area is an area covered by the touch image in the fingerprint collection region; a second execution unit 710 configured to, if the touch image meets the preset condition, execute a second preset action, where the second preset action is used to indicate that the touch image is inconsistent with the fingerprint sample, and the second preset action is vibration and/or making an alert sound; a third execution unit 711 configured to, if a quantity of times of continuously executing the second preset action is greater than or equal to a third preset value, lock the electronic device within a preset time; and a first determining unit 712 configured to, if the touch image does not meet the preset condition, execute no action.

Refer to the embodiment shown in FIG. 3 for details of a specific process in which the electronic device in this embodiment executes the fingerprint recognition method, and details are not described in this embodiment.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A fingerprint recognition method, used for an electronic device having a fingerprint recognition sensor, the method comprising:
    collecting, by the electronic device, a touch image in a fingerprint collection region of the fingerprint recognition sensor;
    determining, by the electronic device, whether the touch image is consistent with a pre-stored fingerprint sample;
    executing, by the electronic device, a first preset action corresponding to the pre-stored fingerprint sample when the touch image is consistent with the pre-stored fingerprint sample;
    determining, by the electronic device, whether the touch image meets a preset condition when the touch image is inconsistent with the pre-stored fingerprint sample, the preset condition being that a coverage area of the touch image is greater than or equal to a first preset value and image quality of the touch image is greater than or equal to a second preset value, and the coverage area being an area covered by the touch image in the fingerprint collection region;
    executing, by the electronic device, a second preset action when the touch image meets the preset condition, the second preset action being used to indicate that the touch image is inconsistent with the pre-stored fingerprint sample; and executing, by the electronic device, no action when the touch image does not meet the preset condition.

2. The method of claim 1, wherein before determining whether the touch image meets the preset condition, the method further comprises:
  determining a target touch image set, the target touch image set comprising multiple pre-stored target touch images that are consistent with the pre-stored fingerprint sample;
  determining coverage areas and image quality of all the target touch images in the target touch image set;
  determining the first preset value according to the coverage areas of the target touch images in the target touch image set; and
  determining the second preset value according to the image quality of all the target touch images in the target touch image set.

3. The method of claim 1, wherein before determining whether the touch image is consistent with the pre-stored fingerprint sample, the method further comprises configuring a correspondence list, the correspondence list comprising one fingerprint sample, correspondences between different fingerprint samples and different first preset actions, and a correspondence between the fingerprint sample and the first preset action, or at least two fingerprint samples.

4. The method of claim 1, wherein the first preset action is one or more of the following: unlocking, running an application program, paying, or dialing a phone number.

5. The method of claim 1, wherein after executing the second preset action, the method further comprises locking the electronic device within a preset time when a quantity of times of continuously executing the second preset action is greater than or equal to a third preset value.

6. The method of claim 1, wherein the second preset action is one or more of vibration or making an alert sound.

7. An electronic device, comprising:
  a fingerprint recognition sensor having a fingerprint collection region;
  a memory storing executable instructions; and
  a processor coupled to the fingerprint recognition sensor and the memory and configured to:
    collect a touch image in the fingerprint collection region of the fingerprint recognition sensor;
    determine whether the touch image is consistent with a pre-stored fingerprint sample;
    execute a first preset action corresponding to the pre-stored fingerprint sample when the touch image is consistent with the pre-stored fingerprint sample;
    determine whether the touch image meets a preset condition when the touch image is inconsistent with the pre-stored fingerprint sample, the preset condition being that a coverage area of the touch image is greater than or equal to a first preset value and image quality of the touch image is greater than or equal to a second preset value, and the coverage area being an area covered by the touch image in the fingerprint collection region;
    execute a second preset action when the touch image meets the preset condition, the second preset action being used to indicate that the touch image is inconsistent with the pre-stored fingerprint sample; and
    execute no action when the touch image does not meet the preset condition.

8. The electronic device of claim 7, wherein the processor is further configured to:
  determine a target touch image set, the target touch image set comprising multiple pre-stored target touch images that are consistent with the pre-stored fingerprint sample;
  determine coverage areas and image quality of all the target touch images in the target touch image set;
  determine the first preset value according to the coverage areas of all the target touch images in the target touch image set; and
  determine the second preset value according to the image quality of all the target touch images in the target touch image set.

9. The electronic device of claim 7, wherein the processor is further configured to configure a correspondence list, the correspondence list comprising one fingerprint sample, correspondences between different fingerprint samples and different first preset actions, and a correspondence between the fingerprint sample and the first preset action, or at least two fingerprint samples.

10. The electronic device of claim 7, wherein the first preset action is one or more of the following: unlocking, running an application program, paying, or dialing a phone number.

11. The electronic device of claim 7, wherein the processor is further configured to lock the electronic device within a preset time when a quantity of times of continuously executing the second preset action is greater than or equal to a third preset value.

12. The electronic device of claim 7, wherein the second preset action is one or more of vibration or making an alert sound.

* * * * *